Jan. 17, 1956  M. W. HELLAR, JR., ET AL  2,730,899
DYNAMIC BALANCING APPARATUS
Filed Aug. 19, 1952  2 Sheets-Sheet 1
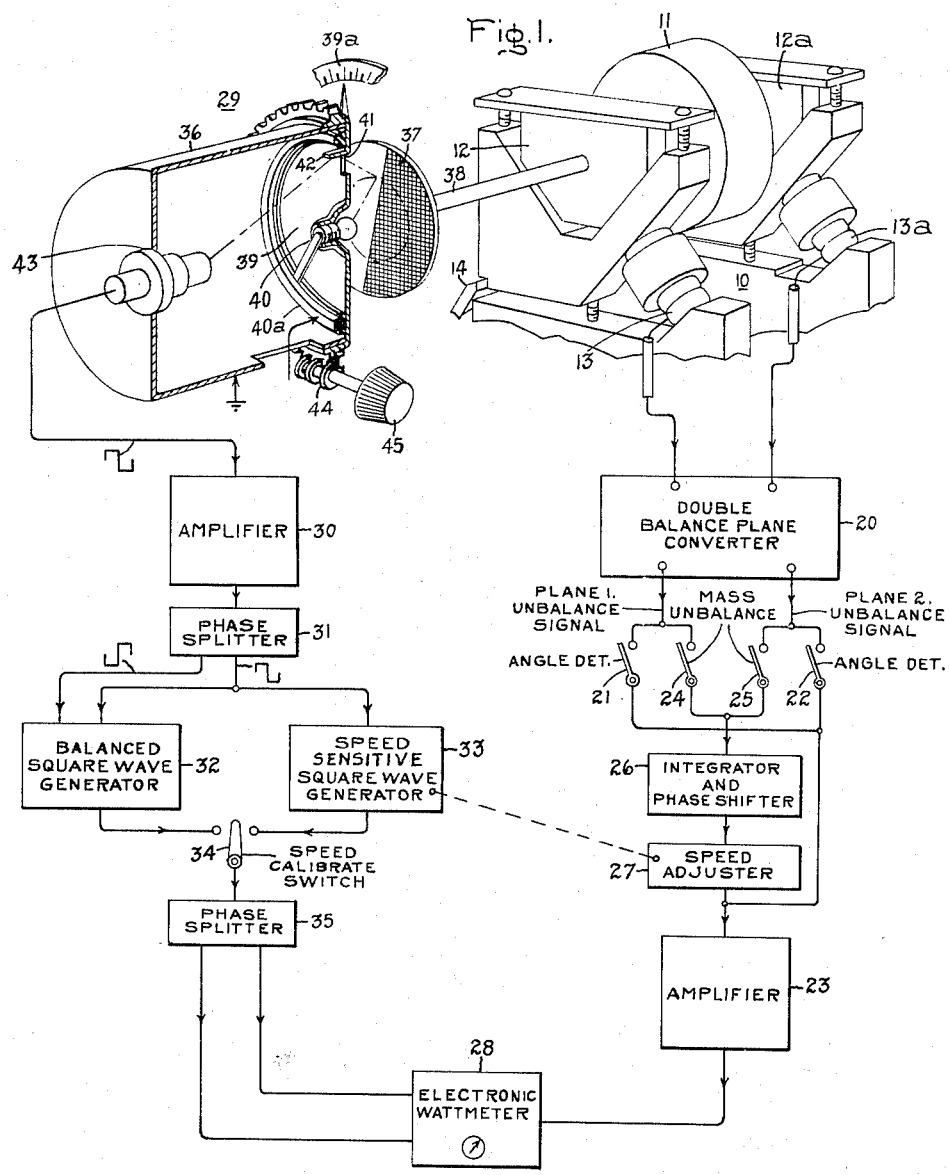
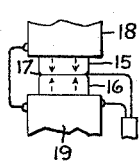
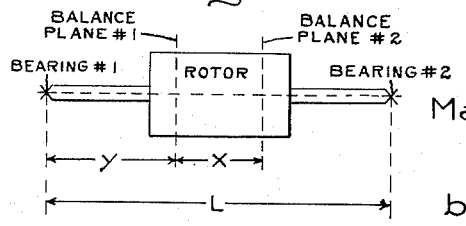
Inventors:
Martin W. Hellar, Jr.
Billy R. Shepard,
by Paul A. Frank
Their Attorney.

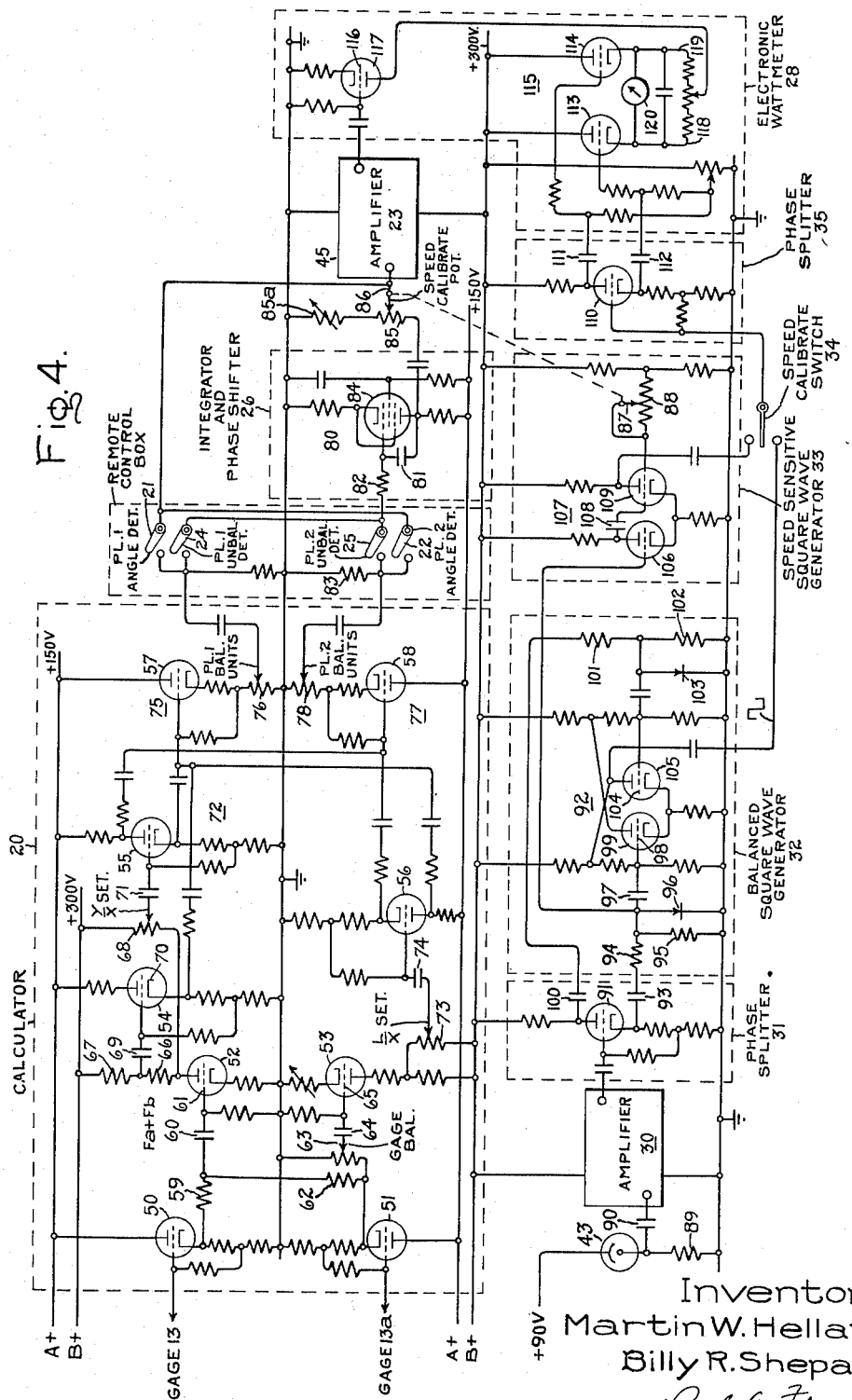

_United States Patent Office_

2,730,899
Patented Jan. 17, 1956

2,730,899

DYNAMIC BALANCING APPARATUS

Martin W. Hellar, Jr., Schenectady, and Billy R. Shepard, Scotia, N. Y., assignors to General Electric Company, a corporation of New York Application August 19, 1952, Serial No. 305,273

15 Claims. (Cl. 73—463)

This invention relates to dynamic balancing apparatus and more particularly to "rigid pedestal" type balancing apparatus in which a rotating body to be balanced is journalled in rigidly supported bearings and the unbalance force acting upon the bearings at rotor speeds below the "first critical" speed is detected by suitable force gages. These bearing restraining unbalance forces are dependent upon rotor speed and upon the amount and location of the unbalance mass but do not depend upon the mass and moment of inertia of the rotor to be balanced.

Such "rigid pedestal" type balancing apparatus is to be distinguished from "flexible pedestal" type apparatus in which the rotor is flexibly coupled within its bearings and driven at a speed above the first natural resonant speed known as the "first critical" speed of the system. "Rigid pedestal" apparatus is designed to have a relatively high first critical speed, for example, above 200 cycles per second, while "flexible pedestal" apparatus is designed to have a relatively low first critical speed, for example, below 5 cycles per second. In "flexible pedestal" apparatus, the rotor turns as though the bearings provided negligible restraint and thus behaves as a free body which, of course, tends to rotate about an axis representing a stationary value of rotational kinetic energy. Velocity or displacement gages are ordinarily employed to detect the resulting displacement of a principal rotor axis of inertia from the bearing center line. This rotor axis displacement is dependent upon the amount and location of the unbalance masses and upon the mass and moment of inertia of the rotor, but not upon its rotational speed.

One of the difficult problems involved in providing a suitable "rigid pedestal" type balancing apparatus is that the detected unbalance-force-representing voltage varies with variations in the speed of the rotor. If the speed of the rotor is unknown, the absolute magnitude of the unbalance force voltage cannot be used as a measure of the unbalance mass. If the rotor is driven at different known speeds, the unbalance force voltage measuring means must be calibrated for each such speed. Moreover, because of the rotor speeds involved, usually less than 30 C. P. S., a double integration of the detected unbalance force voltage by electrical integrating circuits in an attempt to make the integrated voltage independent of speed variations, results in an unbalance mass-displacement signal voltage which is extremely sensitive to low frequency pedestal vibration, particularly shock-type pedestal vibration such as produced when someone walks over the floor upon which the rotor supporting pedestal is mounted.

One important object of the invention, therefore, is to provide a rigid-type balancing apparatus which may be easily adjusted to give an accurate reading of unbalance mass at any known or unknown rotational speed of the rotor.

In both "rigid pedestal" and "flexible pedestal" type balancing machines, some rotation sensing device is customarily included for deriving a voltage signal whose time or amplitude condition represents a particular predetermined angular position of or point on the rotor. The time phase or maximum amplitude condition of the unbalance-mass-representing signal voltage is then related to or compared against this angular position reference signal voltage in order to determine the exact angular location of the unbalance mass in the rotor to be balanced. Another object of the invention is to provide apparatus by which a position reference signal voltage of a rigid pedestal type balancing machine may also be employed to enable a speed compensating adjustment of an unbalance mass representing voltage produced by the force gages of the machine.

A still further object of the invention is to provide an improved angular position sensing unit which produces, in response to the rotation of a body to be balanced, a phase-adjustable output voltage particularly well suited to enable a speed adjustment of the unbalance mass signal as well as to enable a precise angular location of the unbalance mass.

In general, dynamic balancing apparatus in accord with the invention comprises means for developing an unbalance force representing voltage and a rotor angular position detecting alternating voltage, and means for making a speed compensating adjustment of the amplitude of the unbalance force representing voltage in accord with rotor speed responsive changes in the positive-to-negative alternation duration ratio of the developed angular position detecting voltage. In making this adjustment the absolute duration of one polarity alternations of the angular position detecting voltage is varied until a balanced wave of equal duration positive and negative alternations is achieved regardless of the frequency of the generated alternating voltage cycle.

In accord with another feature of the invention, an electronic wattmeter is connected to receive the unbalance force representing voltage and the angular position detecting voltage, and functions both to indicate the achievement of a balanced wave condition of the angular position detecting voltage and to measure the amplitude of unbalance under a predetermined relative phase condition between these two input voltages.

In accord with a further feature of the invention, an angular position sensing channel of the balancing apparatus is constructed to produce during each revolution of the rotor to be balanced two voltage pulses representing the time that two 180 degree angularly displaced points on the rotor traverse a reference pick-up point. One of these two voltage pulses is employed to initiate the generation of the speed unbalanced angular position detecting alternating voltage utilized to make the speed compensating adjustment of the unbalance force voltage, as mentioned above. Each of these two voltage pulses is also employed to initiate the generation of a particular polarity alternation of another alternating voltage such that a 50—50 percent or "balanced" voltage wave is produced regardless of the speed of the rotor to be balanced. This latter balanced voltage wave is then used directly in an electronic wattmeter to orient the phase of an unbalance force voltage measured by the wattmeter regardless of rotor speed.

In accord with a still further feature of the invention, the angular position sensing apparatus comprises an optical system in which an illuminating lamp and a light-sensitive element are both axially aligned with the axis of rotation of the rotor to be balanced. A disk is connected to rotate together with the rotor in a plane perpendicular to the rotor axis of rotation and contains suitable marks or different color patterns to cause, upon rotation, a light-intensity variation of light rays reflected from a circular locus of equally spaced points on the disk. A light reflecting member is arranged to be adjustably rotatable along a circular path about the rotor axis of rotation such that the reflecting member may be adjusted to reflect upon the light-sensitive element the light rays emanating from the lamp and reflected from any point in this circular locus of disk points. This optical arrangement enables a determinable phase adjustment of the angular position reference signal output of the light sensitive element without any lateral or arcuate movement of either the lamp or the light sensitive element which may thus both be permanently and accurately aligned to the rotor axis of rotation.

The novel features which are believed to be characteristic of the invention are set forth with particularity in the appended claims. The invention itself, however, together with further objects and advantages thereof can best be understood by reference to the following description taken in connection with the accompanying drawings in which Fig. 1 is a perspective diagrammatic sketch of a rigid rotor pedestal and angular position sensing unit in conjunction with a block diagram of suitable circuitry included in a dynamic balancing apparatus embodying the invention, Fig. 2 is a detailed view of force gages preferably employed in the apparatus of Fig. 1, Fig. 3 is a geometrical diagram illustrating certain distances involved in adjusting a balance plane converter included in the apparatus of Fig. 1, while Fig. 4 is a schematic circuit diagram of the electrical circuit components of the apparatus of Fig. 1.

Referring to Fig. 1, there is shown a rigid rotor pedestal 10 is which a rotor 11 to be balanced is journalled between rigidly supported bearings 12, 12a, and the resulting dynamic unbalance forces acting upon these bearings are sensed by suitable force gages 13, 13a, included in the bearing supports. Bearings 12, 12a are mounted upon supports such as knife edges 14, as well as upon gages 13, 13a. Each knife edge and associated force gage is located in a plane perpendicular to the bearing axis and displaced 90 degrees relative to each other. The support action of the knife edges is preferably along a line passing through the bearing axis while the supporting and force sensing action of the force gages is along a line perpendicular to the line of knife edge support action and also passes through the bearing axis. In this way each force gage measures the components of unbalance force exerted by the rotating body in the radial direction along which the gages are located. As shown in detail in Fig. 2, force gages 13, 13a may each conveniently comprise two piezoelectric barium titanate slabs 15, 16 separated by a common central electrode 17 and polarized in opposite directions relative to the central electrode. A voltage is generated between the central electrode 17 and the interconnected slab supporting outer electrodes 18, 19, that is proportional to the compressive force exerted upon the slabs 15, 16. The output voltage from each force gage 13, 13a is thus a sinusoidally varying voltage whose instantaneous amplitude is a measure of the instantaneous magnitude of the unbalance force component acting upon the bearings.

The force gage output voltages are supplied to a balance plane converter 20 which transforms the force gage output voltages into two other voltages representing the unbalance force attributable to the unbalance mass lying in each of two arbitrarily preselected rotor balancing planes, designated in Fig. 3 as balance plane 1 and balance plane 2. Balance plane converter 20 forms a portion of the subject matter described and claimed in application, Serial No. 305,271, filed concurrently with the present application by R. O. Fehr, C. S. Duckwald, R. J. Ringlee and M. W. Hellar, Jr., and assigned to the present assignee. The actual circuitry of converter 20 is hereinafter described in connection with Fig. 4.

The converter output voltages representing the unbalance force components attributable to rotor balancing planes 1 and 2 may then be individually supplied through angle detecting switches 21 or 22 directly to amplifier 23, or may be individually supplied through mass unbalance switches 24 or 25 to amplifier 23 through a combination integrator and phase shifter 26 and a speed adjuster 27. The output voltage from amplifier 23 is supplied to one input circuit of an electronic wattmeter 28. Rotor pedestal 10, force gages 13 and 13a, balance plane converter 20, integrator and phase shifter 26, speed adjuster 27, and amplifier 23 may be considered an "unbalance mass detecting channel" of the apparatus of Fig. 1.

The other input circuit of wattmeter 28 receives its signal voltage from an "angular position reference detecting channel" comprising angular position sensing apparatus 29, amplifier 30, phase splitter 31, balanced square wave generator 32 connected in parallel with speed sensitive square wave generator 33, a speed calibrating switch 34 which selects the output of either the balanced generator 32 or the speed sensitive generator 33, and another phase splitter 35.

The detailed operation of the balancing apparatus is described hereinafter in connection with the circuit diagram of Fig. 4. In general, however, the apparatus may be calibrated for the particular speed at which rotor 11 is driven by throwing switch 34 to select the output of the speed sensitive square wave generator 33 and a balancing adjustment of this speed sensitive generator is made until wattmeter 28 reads zero. This adjustment is mechanically interconnected with speed adjuster or calibrator 27 in the unbalance mass detecting channel and introduces an automatic compensation for amplitude variations due to different speeds at which the rotor may be driven. The angular location of the unbalance mass may be determined by closing angle detection switches 21 or 22, whereupon the unbalance mass detecting channel supplies a varying signal voltage to one input circuit of wattmeter 28 whose amplitude is determined by the amplitude of the unbalance force component in either balancing plane and whose phase is determined by the angular location of the unbalance mass. The angular position reference detecting channel, with switch 34 selecting the output voltage of balanced generator 32, supplies a square wave to the other input circuit of wattmeter 28 whose phase represents a predetermined circumferential point on the rotor to be balanced. By adjusting the phase of this input square wave until the meter reads zero, or a predetermined minimum null position, the unbalance force signal is made exactly 90 degrees out-of-phase with the angular position reference signal. The amount of such phase adjustment is calibrated to indicate the angular position of the unbalance mass on the rotor. Switches 21 or 22 may then be opened and switches 24 or 25 closed. Wattmeter 28 then indicates a value representing the actual amplitude of the unbalance mass in the selected balancing plane.

Angular position sensing apparatus 29 is constructed to provide two signal voltages during each rotational cycle of rotor 11 whose time of occurrence represents and gives reference to two 180° angularly displaced points on the rotor. Two 180° displaced signal voltages are thus produced during each cycle of rotor 11 regardless of the speed at which rotor 11 is driven. One convenient and desirable construction of a suitable angular position sensing apparatus is illustrated in Fig. 1 as comprising a photoelectric sighting unit 36 and a small lightweight disk 37 which is fastened at its center to the supporting axle 38 of rotor 11 and rotates together therewith. One semicircular area or half of disk 37 is painted black so as to constitute a non-reflecting surface, while a contiguous semicircular area such as the other half of disk 37 is painted white or otherwise fashioned to constitute a highly reflective surface. Within sighting device 36 and in closely spaced axial alignment with disk 37 is another disk or gear 39 having a small lamp 40 extending through and supported at the center thereof and arranged to illuminate the painted surface of disk 37. Suitable electrical connections may be made to lamp 40 by slip rings 40a carried by gear 39. Gear 39 has a small radial slit 41 near its circumference, and also carries a small mirror 42 projecting inwardly above slit 41. Mirror 42 is arranged to deflect toward phototube 43 light rays emanating from lamp 40 and reflected from a point on the surface of disk 37 through slit 41. Phototube 43 is also aligned to the axis of rotation of disk 37. Gear 39 is arranged to be adjustably rotated to any desired angular position about its axis as indicated upon scale 39a by any suitable means such as a driving pinion gear 44, and knob 45 attached thereto. Due to the axial alignment of photoelectric cell 43, lamp 40 and the center of disk 37, it will be appreciated that light reflected from disk 37 will be re-deflected by mirror 42 upon photoelectric cell 43 regardless of the rotational position of light directing gear 39. Moreover, as disk 37 rotates, the light reaching photoelectric cell 43 emanates alternately from the dark and light sections of disk 37. The intensity of the light reaching photoelectric cell 43 thus varies in accord with a square wave and a square wave output voltage is produced by photoelectric cell 43. The point of crossover from light to dark regions on disk 37 with gear 39 in a particular position can, of course, be calibrated to indicate a particular rotational position of rotor 11. The phase of the square wave output voltage from photoelectric tube 43 can be varied relative to this initial phase condition to indicate a correspondingly angularly displaced position of rotor 11 by merely varying the rotational position of gear 39 while rotor 11 is rotating. One important advantage of this angular position sensing apparatus 29 is that the sighting unit 36 may be fixedly supported in permanent axial alignment with rotor axle 38. Neither lamp 40 nor phototube 43 need be moved out of position, and any errors resulting from improper alignment during the required phase adjustment of the output signal voltage are thus greatly minimized.

Referring now to Figs. 3 and 4 there is shown a schematic circuit diagram of the electrical apparatus shown in block diagram in Fig. 1 and a schematic diagram of the geometrical parameters involved in pre-setting the balance plane converter. As mentioned above in connection with the block diagram of Fig. 1, balance plane converter 20 transforms the two input bearing unbalance force voltages sensed by force gages 13 and 13a into two output voltages which represent the unbalance forces at two arbitrarily preselected balancing planes of rotor 11. This is done by electrically factoring into the voltage received from gages 13 and 13a the particular geometry of the unbalance force sensing unit 10. The three distances which must be known in order to preset balance plane converter 20 are illustrated in Fig. 3 as the distance L between the two unbalance force pickup points, i. e., the distance between bearings 12 and 12a in the rigid pedestal sensing unit 10 of Fig. 1; the distance Y between one pickup point (bearing 12) and an adjacent preselected balancing plane 1 of the rotor to be balanced; and the distance X between the two preselected balancing planes 1 and 2 of the rotor. These distances may be easily measured either before or after rotor 11 is inserted in the pedestal.

The unbalance forces $F_1$ and $F_2$ at balance planes 1 and 2 may be expressed in terms of the unbalance force sensed by gages 13 and 13a in accord with the following equations:

(I) $\quad F_1 = (Fa+Fb) + \frac{Y}{X}(Fa+Fb) - Fb\left(\frac{L}{X}\right)$ (II) $\quad F_2 = Fb\left(\frac{L}{X}\right) - \frac{Y}{X}(Fa+Fb)$ where $Fa$ is the unbalance force acting on bearing 22, $Fb$ is the unbalance force acting on bearing 23, and L, X, and Y are the distances described above in connection with Fig. 3.

Suitable electrical circuitry for deriving these two unbalance voltages at balancing planes 1 and 2 in terms of the output voltage of the force gages 13 and 13a and the geometry of the unbalance force pickup unit is illustrated in Fig. 4 as comprising electron discharge devices 50 through 58 inclusive, and circuitry associated therewith. Discharge devices 50 and 51 receive the output voltages from force gages 13 and 13a respectively, and are connected in conventional cathode follower circuits to supply corresponding output voltages to the control electrodes of discharge devices 52 and 53, respectively. A portion of the voltage developed at the cathode of discharge device 50 is coupled through resistor 59 and capacitor 60 to the control electrode 61 of discharge device 52, and a portion of the voltage developed at the cathode of discharge device 51 is similarly coupled through resistor 62 and capacitor 60 to the control electrode 61. The ohmic value of resistor 62 is chosen to be such that the voltage applied to control electrode 61 represents a force proportional to the sum of the unbalance forces $FA+FB$ derived from force gages 13 and 13a. The voltage at the cathode of discharge device 51 is also connected through a gage balancing potentiometer 63 and coupling capacitor 64 to the control electrode 65 of discharge device 53. The voltage at control electrode 65 thus represents the unbalance force derived solely from gage 13a.

Discharge device 52 is connected in a conventional amplifier stage having two resistors 66 and 67 in its anode circuit. Resistor 66 has an ohmic value substantially greater than the ohmic magnitude of resistor 67 such that the voltage variation at the anode of discharge device 52 is much larger than the voltage variation at the point of connection between resistors 66 and 67. Both voltages are reversed in phase from the voltage supplied to control electrode 61 and are therefore proportional to the negative sum of the forces $FA+FB$ acting upon both force gages 13 and 13a. The voltage at the anode of discharge device 52 is applied across a potentiometer 68 which is adjusted in accord with the ratio between the distance Y from bearing 12 to preselected balance plane 1 and the distance X from the balance plane 1 to balance plane 2. Potentiometer 68 may thus be termed the "Y/X adjustment." The voltage at the mid-connection between resistors 66 and 67 is coupled through capacitor 69 to the control electrode of discharge device 54 connected as a conventional cathode follower stage. The voltage at cathode 70 of device 54 is thus also proportional to the negative sum of $(FA+FB)$.

The voltage at the adjustable tap of potentiometer 68 is coupled through capacitor 71 to the control electrode of discharge device 55 connected in a phase splitting amplifier stage 72. This phase splitting amplifier stage 72 is constructed to provide output cathode and anode voltages which are of identical amplitude but 180° out-of-phase. The Y/X adjust potentiometer 68 is calibrated such that for a Y/X ratio equal to 1, the voltages at the anode and cathode of discharge device 55 are both equal in amplitude to the voltage at the cathode 70 of discharge device 54. Since the voltage at the cathode 70 is proportional to the negative sum of the forces acting upon gages 13 and 13a, then the voltages derived at the anode and cathode of discharge device 55 are respectively proportional to the values plus and minus $Y/X(FA+FB)$.

Returning now to discharge device 53, the voltage supplied to its control electrode solely from the output of gage 11 is amplified by an amplification stage associated with discharge device 53 and applied across a potentiometer 73 connected in the output circuit of the stage. Potentiometer 73 is adjusted in accord with the ratio of the distance L between the bearings 12 and 12a and the distance X between the selected balancing planes 1 and 2. This potentiometer 73 may thus be called the "L/X adjustment" for the balance plane converter 20. The voltage at the movable tap of potentiometer 73 is coupled through capacitor 74 to the control electrode of discharge device 56 connected in a phase splitting amplifier stage to provide anode and cathode voltages respectively representing plus and minus $L/X(FB)$.

The cathode voltage of discharge device 54, the cathode voltage of discharge device 55, and the anode voltage of discharge device 56 are all coupled to the control electrode of discharge device 57 connected in an output cathode follower stage 75. The voltage developed across potentiometer 76 in the cathode circuit of this cathode follower stage 75 is thus proportional, with all signs reversed, to the quantity $$\frac{Y}{X}(FA+FB)+(FA+FB)-FB\left(\frac{L}{X}\right)$$

This voltage represents the unbalance force at balance plane 1, as explained above in connection with Equation I.

The cathode voltage of discharge device 56 and the anode voltage of discharge device 55 are both coupled to the control electrode of discharge device 58 connected in a conventional cathode follower output stage 77 of the balance plane converter 20. The voltage developed across a potentiometer 78 in the cathode circuit of this cathode follower stage 77 is thus proportional, with all signs reversed, to the quantity $FB(L/X)-Y/X(FA-FB)$. This voltage represents the unbalance force at balance plane 2 as explained above in connection with Equation II. Potentiometers 76 and 78 may, of course, be calibrated to represent the unbalance forces at planes 1 and 2 in terms of any desired unbalance force units.

Referring still to Fig. 4, integrator and phase shifter 26 preferably constitute a pentode amplifier stage 80 having a large capacitor 81 connected between the anode and the control electrode thereof. Capacitor 81 performs the integrating function of the circuit and together with resistors 82 and 83 causes a 90 degree phase shift in the output voltage appearing at the anode of the pentode discharge device 84. The mass-acceleration representing voltages at the cathode of either discharge device 57 or 58 is converted by integrator 26 into a voltage representing the mass-velocity component of the unbalance force. The magnitude of this mass-velocity component is dependent upon rotor speed, but a speed calibration adjustment is made by virtue of a potentiometer 85 connected to receive the voltage developed at the anode of discharge device 84. The output of potentiometer 85 now becomes a mass displacement component of the unbalance force. The adjustable tap 86 of potentiometer 85 is mechanically connected together with the adjustable tap 87 of an adjustable resistor 88 included in the speed unbalanced square wave generator 33, as indicated. The manner in which potentiometer 85 and resistor 88 are simultaneously adjusted to accomplish this speed calibration is further discussed hereinafter.

Referring in Fig. 4 to the circuit diagram of the angular position detecting channel of the apparatus, the output voltage in the photoconductive circuit associated with photoelectric tube 43 is a square wave developed across a resistor 89 connected to the anode of phototube 43 and coupled through capacitor 90 to amplifier 30. The output of amplifier 30 is connected to phase splitter 31 which may conveniently constitute a balanced amplifier circuit in which 180 degree out-of-phase square output voltages are taken from both the cathode and anode of the triode discharge device 91 included in the circuit.

The balanced square wave generator 32 which receives the two 180 degree out-of-phase square wave output voltages from the phase splitter 31 is shown as comprising a conventional Eccles-Jordan bi-stable triggered multivibrator circuit 92. The term "bi-stable multivibrator" is used in the art and in this application to connote a circuit having two different and stable output voltage level conditions of operation and capable of very rapid transition between these two operational conditions when energized by a voltage impulse or "trigger." The square wave output at the cathode of discharge device 91 is differentiated by a short-time constant circuit provided by capacitor 93, resistors 94 and 95, and the resulting negative-going spikes of voltage are bypassed to ground by diode 96 such that only positive-going spikes or "triggers" are coupled through capacitor 97 to the control electrode 98 of triode discharge device 99 in the Eccles-Jordan circuit 92. These positive-going triggers will, of course, occur only during the positive-going rise of voltage in the square wave derived from the cathode of discharge device 91.

The square wave voltage at the anode of discharge device 91 is similarly differentiated by capacitor 100 and resistors 101 and 102, with the negative-going spikes of the resulting differentiating voltage discarded by diode 103 such that only positive-going trigger voltages are supplied to the control electrode 104 of discharge device 105 in the Eccles-Jordan circuit 92. Due to the phase inversion across the discharge device 91, however, the positive-going triggers supplied to discharge device 99 occur at the beginning of the positive-going half-cycles of the input square wave voltage cycle, while the positive voltage triggers supplied to discharge device 105 occur at the beginning of the negative-going half-cycles of the input square wave cycle. Since the input square wave voltage derived from the photoelectric tube 43 has alternating polarity variations of equal duration, the output of the Eccles-Jordan circuit taken from the anode of discharge device 105 is accordingly a balanced square wave having alternations of constant amplitude and equal duration, with a highly rectangular wave form.

The differentiated positive-going voltage pulses appearing across resistor 95 are also directly connected to the control electrode of a triode electron discharge device 106 in the speed-sensitive square wave generator 33. This speed-sensitive square wave generator 33 constitutes a mono-stable multivibrator circuit 107 whose time of recovery back to its stable condition after being thrown into its unstable condition by an input positive voltage pulse depends upon the time required to charge a capacitor 108 through adjustable resistor 88 to a voltage which initiates conduction in a discharge device 109 of the multivibrator 107. The term "mono-stable multivibrator" is used in the art and in this application to connote a circuit having a stable and an unstable output voltage level condition of operation and which transfers very rapidly from its stable condition into its unstable condition when energized by an input voltage pulse and then returns after a predetermined interval, very rapidly to its initial stable operational condition. Since, for any given setting of adjustable resistor 88, the mono-stable multivibrator 107 is maintained in an unstable operational condition for a period of constant duration, any variation in the pulse repetition frequency of the input trigger signal supplied to the multivibrator circuit varies the ratio between the unstable and stable operational conditions of the multivibrator. The input pulse repetition frequency depends, of course, upon the speed of rotation of rotor 11. The output voltage at the anode of discharge device 109 is thus usually not a balanced square wave, but rather, for any given setting of variable resistor 88, has a ratio of positive-going alternation to negative-going alternation duration which varies in accord with the frequency of input trigger occurrence.

Phase splitter 35, which receives the voltage through speed switch 34 either from the balanced square wave generator 32 or the unbalanced square wave generator 33, is identical with phase splitter 31, and provides two simultaneous square wave output voltages from the cathode and anode of an included discharge device 110 which are 180 degrees out-of-phase with each other. These two out-of-phase voltages are supplied through coupling capacitors 111 and 112 respectively to gate discharge devices 113 and 114 included as the balancing arms of a bridge type circuit 115 in the electronic wattmeter 28.

The electronic wattmeter 28 is shown as a conventional type in which an alternating signal supplied from amplifier 23 to the control electrode 116 of a triode discharge device 117 varies the current permitted to flow simultaneously through two balanced arms 118 and 119 of a bridge circuit including devices 113 and 114 respectively. Discharge devices 113 and 114 are alternately "gated," or turned on, by the square wave voltages supplied to their respective control electrodes from the anode and cathode of discharge device 110, and thus may pass current for alternate half-cycles of the total square wave cycle. The amplitude of the square wave voltage output of discharge device 110 is great enough to drive discharge devices 113 and 114 between a full conduction condition and a completely non-conducting condition. In this way minor variations in the amplitude of the output voltage of discharge device 110 have no effect upon the reading of meter 120. The frequency of the unbalanced force voltage supplied to the control electrode 116 of discharge device 117 from amplifier 23 is, of course, equal to the frequency of the square wave derived from the angular position sensing apparatus 29. It is thus apparent that if the alternating voltage supplied to the control electrode 116 is 90 degrees out-of-phase with the square wave voltage supplied to the control electrode of phase splitter discharge device 110, equal curents flow in branches 118 and 119 of the electronic wattmeter bridge circuit 115. The direct current meter 120 connected between the cathodes of discharge devices 113 and 114 then reads zero or a minimum value. If, on the other hand, the alternating voltage at the control electrode 116 of discharge device 117 is in-phase with the gating voltage supplied to the control electrodes of either discharge device 113 or 114, meter 120 reads a positive or negative value depending upon the product of the magnitude of the alternating voltage supplied to control electrode 116 times the cosine of the phase angle between this unbalance force voltage and the wattmeter gating square wave voltage supplied to the control electrode of discharge device 110. The amplitude of the square wave gating voltage has no effect upon the indication of meter 120 because of the above described amplitude limiting action of gating devices 113 and 114.

In the operation of the apparatus described in connection with Figs. 1 and 4, the output potentiometers 76 and 78 in balance plane converter 20 are adjusted to read any desired mass eccentricity balance units, potentiometer 68 is adjusted in accord with the ratio of Y/X, and potentiometer 73 is adjusted in accordance with the ratio of L/X. A driving machine (not shown) is then energized to rotate rotor 11 within the bearings of rigid pedestal 10. Speed calibrate switch 34 is thrown to a position supplying the output voltage from the speed unbalanced square wave generator 33 to the control electrode of phase splitter discharge device 110. The movable tap 87 of variable resistor 88 is then adjusted until the meter 120 reads zero or the desired minimum value. It will be appreciated that no unbalance force signal is being supplied to the control electrode 116 of discharge device 117 in the wattmeter circuit during this speed adjustment. This variation of resistor 88 until meter 120 reads zero thus regulates the duration of each alternation of the square wave output voltage from generator 33 until the positive and negative-going alternations supplied to the control electrodes of discharge devices 113 and 114 have equal duration. This adjustment of the movable tap 87 of variable resistor 88 also produces a corresponding adjustment of the variable tap 86 of speed calibrating potentiometer 85. The increment of resistance change of potentiometer 85, as modified by a tracking adjustable resistor 85a connected in series therewith, can easily be made to be such as to compensate for amplitude variations resulting from different rotor speeds.

After the speed calibrating potentiometer 85 is properly adjusted, speed calibrate switch 34 is thrown into a position supplying the output square wave voltage from the balanced square wave generator 32 to the control electrode of phase splitting discharge device 110. The balance plane #1 angle detecting switch 21 is closed and light directing gear 39 in the sighting unit 36 rotated by turning knob 45 until meter 120 in the wattmeter circuit again reads zero. When this adjustment is made, the plane #1 unbalanced force voltage developed across potentiometer 76 is exactly 90 degrees out-of-phase with the square wave output voltage produced by photo-electric tube 43 and developed across resistor 89. Since the phase of the square wave photoelectric tube output voltage depends upon the position of gear 39 relative to the rotational position of rotating disk 37, knob 45 may be calibrated to indicate the angular displacement of the mass unbalance in plane 1 from a point or radial line on rotor 31 represented, for example, by the light-to-dark cross-over line on disk 37. If, for example, meter 120 reads zero when gear 39 is in a position such that slit 41 extends in a direction parallel to the direction of the force gage axes, the measured unbalance mass component is, of course, located in the rotor along the angular direction defined by the light-to-dark cross-over line on disk 37. If, on the other hand, meter 120 reads zero when slit 41 extends in a direction perpendicular to the force gage axes, the unbalance mass is located in the rotor along a radial line perpendicular to the light-to-dark cross-over line of disk 37. The direction of angular displacement from the reference line depends, of course, upon the direction of rotation of rotor 11.

The plane 1 angle detecting switch 21 is then opened again, and the plane 1 unbalance detecting switch 24 closed to supply an integrated, speed adjusted, and 90 degree phase shifted unbalance force voltage through amplifier 23 to the control electrode 116 of discharge device 117 in the electronic wattmeter circuit 28. Meter 120 then reads the actual maximum value of the unbalance mass-radius component of the unbalance force in balance plane 1. The reading of meter 120 can be calibrated in terms of mass radius units, and this reading may be multiplied by the actual radius of the rotor at the balance plane 1 to determine the amount of balance weight to be added to or detracted from this plane of the rotor in order to accomplish the balancing function.

This balancing procedure may be repeated for balance plane 2, and the location and magnitude of the unbalance force in balancing plane 2 determined in the same manner without interrupting the rotation of rotor 11.

Although we have shown a particular embodiment of the invention, many modifications can be made and it is to be understood that we intend to cover by the appended claims all such modifications as fall within the true spirit and scope of the invention.

What we claim as new and desire to secure by Letters Patent of the United States is:

1. Apparatus for analyzing unbalances in a rotating body comprising, means coupled to said rotating body for generating alternating voltage cycles in response to the cyclical occurrence of a predetermined angular position of the rotating body, means in said alternating voltage generating means for adjusting the absolute duration of one alternation of each generated voltage cycle, means connected to the output of said last-mentioned means to receive said alternating voltage cycles for indicating an equal duration condition of both alternations of each said voltage cycle, means operatively connected to said rotating body for developing a voltage proportional to an unbalance force component of the rotating body, and means connected to said alternation duration adjusting means for simultaneously adjusting the magnitude of said unbalance force representing voltage.

2. Apparatus for analyzing unbalances in a rotating body comprising, means coupled to said rotating body for generating alternating voltage cycles in response to the cyclical occurrence of a predetermined angular position of the rotating body, means in said alternating voltage generating means for adjusting the absolute duration of one alternation of each generated voltage cycle, means operatively connected to said rotating body for developing a second alternating voltage proportional to an unbalance force component at a point on the rotating body, an electronic wattmeter connected to measure said unbalance force representing voltage and including a bridge circuit connected to receive said generated voltage cycles for indicating an equal duration condition of both alternations thereof, and means connected to said alternation duration adjusting means for simultaneously adjusting the magnitude of said unbalance force representing voltage.

3. Apparatus for analyzing unbalances in a rotating body comprising, means coupled to said rotating body for generating a first alternating voltage in response to the cyclical occurrence of a determinable angular position of the rotating body, means in said first alternating voltage generating means for adjusting the absolute duration of one alternation of each generated voltage cycle, means operatively connected to said rotating body for developing a second alternating voltage proportional to the unbalance force produced by the unbalance mass at an unknown point on the rotating body, means connected to said alternation duration adjusting means for simultaneously adjusting the magnitude of said second alternating voltage, an electronic wattmeter connected to receive the alternation duration adjusted first alternating voltage and the unbalance force representing second alternating voltage for indicating an equal duration condition of both alternations of said first alternating voltage and for measuring the amplitude of said second alternating voltage under an equal alternation duration condition of said first alternating voltage, and an electric 90 degree phase shifting circuit arranged to be connected in circuit with said second alternating voltage developing means and said wattmeter for electrically shifting the phase of said second alternating voltage 90 degrees.

4. Apparatus for analyzing unbalances in a rotating body comprising, means coupled to said rotating body for generating a first alternating voltage in response to the cyclical occurrence of a determinable angular position of the rotating body, means in said first alternating voltage generating means for adjusting the absolute duration of one alternation of each generated voltage cycle, means operatively connected to said rotating body for developing a second alternating voltage proportional to the unbalance force produced by the unbalance mass component at an unknown point on the rotating body, an electronic wattmeter connected to receive the alternation duration adjusted first alternating voltage and the unbalance force representing second alternating voltage for indicating an equal duration condition of both alternations of said first alternating voltage and for measuring the amplitude of said second alternating voltage under an equal alternation duration condition of said first alternating voltage, and means mechanically connected to said alternation duration adjusting means for simultaneously adjusting the magnitude of said unbalance force representing voltage for different rotational speeds of said body.

5. Apparatus for analyzing unbalances of a rotating body comprising, means coupled to said rotating body for generating during each revolution of said body two voltage pulses corresponding to the occurrence of two determinable 180 degree angularly displaced positions of said body, means connected to the output of said voltage pulse generating means to receive said voltage pulses for generating a first alternating voltage having alternations of one polarity initiated in response to pulses corresponding to one of said positions and having alternations of opposite polarity initiated in response to pulses corresponding to the other of said positions, means connected to receive the voltage pulses corresponding solely to one of said two positions for generating a second alternating voltage having each alternating voltage cycle initiated in response to said pulses, means in said second alternating voltage generating means for adjusting the absolute duration of alternations of one polarity of said second alternating voltage, means connected to receive said first and second alternating voltages for indicating equal positive-to-negative alternation duration ratios of said first and second alternating voltages, means operatively connected to said rotating body for developing a third alternating voltage proportional to an unbalance force component exerted by the rotating body, and means connected to said alternation duration adjusting means for simultaneously adjusting the magnitude of said unbalance force representing voltage for different rotational speeds of said body.

6. Apparatus for analyzing unbalances of a rotating body comprising, means coupled to said rotating body for generating during each revolution of said body two voltage pulses corresponding to the occurrence of two predetermined 180 degree angularly displaced positions of said body, phase adjusting means operatively coupled to said pulse generating means for simultaneously varying the phase of said voltage pulses relative to the occurrence of said two body positions, a bistable multivibrator circuit connected to receive said phase shifted voltage pulses for providing a balanced square wave output voltage having alternations of one polarity initiated in response to pulses corresponding to one body position and having alternations of opposite polarity initiated in response to pulses corresponding to the other body position, means connected to said rotating body for developing an alternating voltage having a frequency corresponding to the rotational speed of the body and an amplitude proportional to an unbalance component of the rotating body, and an electronic wattmeter circuit connected to measure the product of the developed unbalance-representing alternating voltage times the cosine of the phase difference between this unbalance-representing alternating voltage and said multivibrator circuit output voltage.

7. Apparatus for analyzing unbalances in a rotating body comprising, means coupled to said rotating body for generating during each revolution of the body two voltage pulses upon the occurrence of two determinable 180 degree angularly displaced positions of the body, a bistable multivibrator connected to receive said voltage pulses for providing a balanced square wave output voltage having alternations of one polarity initiated in response to voltage pulses corresponding to one of said body positions and having alternations of opposite polarity initiated in response to pulses corresponding to the other body position, a mono-stable multivibrator connected to respond to voltage pulses corresponding to one of said two body positions for providing an alternating output voltage having a frequency corresponding to the rotational speed of the body, said mono-stable multivibrator having means for adjusting the absolute duration of one polarity alternations of its output voltage, means operatively connected to said rotating body for developing an alternating voltage having a frequency corresponding to the rotational speed of the body and an amplitude proportional to an unbalance force component of the body, means connected to said alternation duration adjusting means of said mono-stable multivibrator for simultaneously adjusting the magnitude of said unbalance force representing voltage, and an electronic wattmeter selectively connected to receive the unbalance force representing voltage and the output voltage of either the mono-stable multivibrator or the bistable multivibrator.

8. Dynamic balancing apparatus comprising a pair of spaced bearings for journalling a rotating body to be balanced, means including electromechanical transducers connected to said bearings for providing two alternating voltages each representing the unbalance force exerted upon a respective bearing by a journalled rotating body, electric computing means connected to receive said two alternating voltages for deriving from said two voltages a third alternating voltage proportional to the unbalance force component attributable solely to a predetermined balancing plane of a journalled rotating body, means operatively coupled to said rotating body for developing a fourth alternating voltage having a frequency corresponding to the rotational frequency of the body and adjustably related in phase to a predetermined recurring angular position of the body, means connected to receive said third and fourth voltages for indicating a 90° out-of-phase condition between said third and fourth voltages, said indicating means measuring the product of said third voltage, said fourth voltage, and the cosine of the phase angle between them, and an electric 90° phase shifting circuit arranged to be connected to receive and shift by 90 degrees the phase of one of said third and fourth voltages received by said indicating means.

9. Dynamic balancing apparatus comprising a pair of rigidly supported spaced bearings for journalling a rotating body to be balanced, means including electromechanical transducers connected to said bearings for providing two alternating voltages each representing the unbalance force exerted upon a respective bearing by a journalled rotating body, electric computing means connected to the output of said transducers to receive said two alternating voltages for deriving from said two voltages a third alternating voltage proportional to the unbalance forces acting upon said bearings by the unbalance mass component in a predetermined balancing plane of a journalled rotating body, means coupled to said rotating body for developing a fourth alternating voltage having a frequency corresponding to the rotational frequency of the body and adjustably related in phase to a predetermined recurring angular position of the body, an electric indicator, means connected to receive said third and fourth alternating voltages for energizing said indicator to an extent proportional to the product of said third and fourth voltages times the cosine of the phase angle between them, and a 90° electric phase shift circuit connectible between said computing means and said indicator for shifting the phase of said third voltage by 90 angular degrees.

10. Dynamic balancing apparatus comprising a pair of rigidly supported spaced bearings for journalling therebetween a rotating body to be balanced, electromechanical transducing means connected to said bearings for providing two alternating voltages respectively responsive to the mass acceleration unbalance forces exerted upon said bearings by a rotating body, electric computing means connected to receive said two voltages for providing a third alternating voltage proportional to the mass-acceleration unbalance forces within a preselected balancing plane of said body, means connected to receive said third alternating voltage for integrating said third alternating voltage to provide a fourth alternating voltage proportional to the mass displacement component of said balancing plane unbalance forces, means coupled to said rotating body for developing a fifth alternating voltage having a frequency corresponding to the rotational frequency of the body and adjustably related in phase to a predetermined recurring angular position of the body, means having two input circuits for measuring the product of two input voltages times the cosine of the phase angle between them, said measuring means having one input circuit connected to receive said fifth voltage, and switching means connected to supply either said third or said fourth voltage to the other input circuit of said measuring means.

11. Dynamic balancing apparatus comprising a pair of rigidly supported spaced bearings for journalling therebetween a rotating body to be balanced, electromechanical transducing means connected to said bearings for providing two alternating voltages respectively responsive to the mass acceleration unbalance forces exerted upon said bearings by a rotating body, electric computing means connected to receive said two voltages for providing a third alternating voltage proportional to the mass acceleration unbalance forces within a preselected balancing plane of said body, means connected to receive said third alternating voltage for integrating and shifting by 90 degrees the phase of said third alternating voltage to provide a phase-shifted fourth alternating voltage proportional to the mass-displacement component of said balancing plane unbalance forces, means coupled to said rotating body for developing a fifth alternating voltage having a frequency corresponding to the rotational frequency of the body and adjustably related in phase to a predetermined recurring angular position of the body, means having two input circuits for measuring the product of two input voltages times the cosine of the phase angle between them, said measuring means having one input circuit connected to receive said fifth voltage, and switching means connected to supply either said third voltage or said phase-shifted fourth voltage to the other input circuit of said measuring means.

12. Apparatus for locating unbalances in a rotating body comprising, a disk having on one face a reflective semicircular area and a contiguous relatively non-reflective semicircular area, said disk being centrally attached to the body for rotation together therewith around the rotational axis thereof, a photosensitive element fixedly positioned in spaced relation with said disk face in line with the axis of rotation of the body, housing means about said photosensitive element for shielding said element from stray light, illuminating means located outside said housing means for illuminating said disk face, means positioned between said disk face and said photosensitive element for selectively directing upon said element light from any fixed point in a circular locus of off-center points on said disk face, means connected to said light directing means for indicating the angular position of a selected off-center disk point, electric circuit means connected to said photosensitive element for providing a first alternating voltage varying in response to intensity variations in light falling upon said element, means operatively connected to said rotating body for developing a second alternating voltage having a frequency corresponding to the rotational speed of the body and a phase corresponding to an unknown angular point of unbalance on the body, and means connected to receive said two alternating voltages for indicating a predetermined relative phase condition between the two alternating voltages.

13. In apparatus for locating the angular position of unbalance in a body mounted for rotation on an axis thereof, a flat disk having a mark on one face and centrally attached to the body for rotation together therewith, a photosensitive element spaced from the marked face of said disk along the axis line of rotation of the body, housing means about said photosensitive element for shielding said element from stray light, illuminating means located outside said housing means for illuminating said disk face, light directing means mounted for adjustable rotation along a circle about the axial line of rotation of the body and arranged to direct upon said element light rays from any point in a circular locus of points around the center of the marked face of said disk, and means operatively coupled to said light directing means for indicating the angular position of said light directing means.

14. In apparatus for locating the angular position of unbalance in a body mounted for rotation on an axis thereof, a flat disk having at least one radially extending mark on one face and centrally attached to the body for rotation together therewith, a light source and a photosensitive element located in consecutive spaced relation with the marked face of said disk along the axial line of rotation of the body, a mirror located between said disk and said photosensitive element and mounted for adjustable rotation at a constant radius about the axial line of rotation of the body selectively to direct upon said element light rays emanating from said source and reflected from any fixed point in a circular locus of points around the marked face of said disk, and means operatively coupled to said mirror for indicating the angular position of said mirror.

15. In apparatus for locating the angular position of unbalance in a body mounted for rotation on an axis thereof, a flat disk having on one face a reflective semicircular area and a contiguous relatively non-reflective semicircular area, said disk being centrally attached to the body for rotation together therewith around the rotational axis thereof, a light source and a photosensitive element located in consecutive spaced relation with the marked face of said disk along the axial line of rotation of the body, a mirror located between said disk and said photosensitive element and mounted for adjustable rotation at a constant radius about the axial line of rotation of the body selectively to direct upon said element light rays emanating from said source and reflected from any fixed point in a circular locus of points around the marked face of said disk, and means operatively coupled to said mirror for indicating the angular position of said mirror.

References Cited in the file of this patent
UNITED STATES PATENTS

| Number | Name | Date |
|---|---|---|
| 2,131,602 | Thearle | Sept. 27, 1938 |
| 2,363,373 | Werner | Nov. 21, 1944 |
| 2,382,843 | Annis | Aug. 14, 1945 |
| 2,451,863 | Oakley | Oct. 19, 1948 |
| 2,461,645 | Kallmann | Feb. 15, 1949 |
| 2,534,918 | Kroft et al. | Dec. 19, 1950 |
| 2,616,289 | Kleckner | Nov. 4, 1952 |